United States Patent [19]

Gundersen

[11] 4,384,642
[45] May 24, 1983

[54] APPARATUS FOR CONVEYING FISH FROM A FIRST LOCATION TO A SECOND LOCATION

[75] Inventor: Georg Gundersen, Madla, Norway

[73] Assignee: Trio Engineering Ltd. A/S, Forus, Norway

[21] Appl. No.: 227,927

[22] Filed: Jan. 23, 1981

[30] Foreign Application Priority Data

Feb. 7, 1980 [NO] Norway ................................ 800325

[51] Int. Cl.³ ............................................ B65G 29/00
[52] U.S. Cl. .................................... 198/624; 198/461
[58] Field of Search ................ 198/624, 461, 626, 817, 198/785, 454, 415

[56] References Cited

U.S. PATENT DOCUMENTS

| | | | |
|---|---|---|---|
| 2,279,573 | 4/1942 | Lang | 198/461 |
| 2,646,722 | 7/1953 | Eastman | 198/624 |
| 2,813,617 | 11/1959 | Sheetz | 198/817 |
| 3,068,918 | 12/1962 | Smith | 198/624 |
| 4,051,952 | 10/1977 | Hauptman | 198/415 |

FOREIGN PATENT DOCUMENTS

| | | |
|---|---|---|
| 868574 | 2/1953 | Fed. Rep. of Germany . |
| 1237504 | 3/1967 | Fed. Rep. of Germany ...... 198/454 |
| 1456513 | 3/1969 | Fed. Rep. of Germany ...... 198/785 |

Primary Examiner—Jeffrey V. Nase
Assistant Examiner—Dennis J. Williamson
Attorney, Agent, or Firm—Watson, Cole, Grindle & Watson

[57] ABSTRACT

Apparatus for individual delivery of fish comprising a substantially V-shaped feed groove in which the fish is given an increasing velocity in the feed direction, the feed groove being provided with feed elements in the form of truncated cones protruding through cut-outs in the groove walls or belts or the like running along the groove walls, the feed elements having mutually increasing speeds towards the bottom of the groove and in the feed direction of the groove.

3 Claims, 4 Drawing Figures

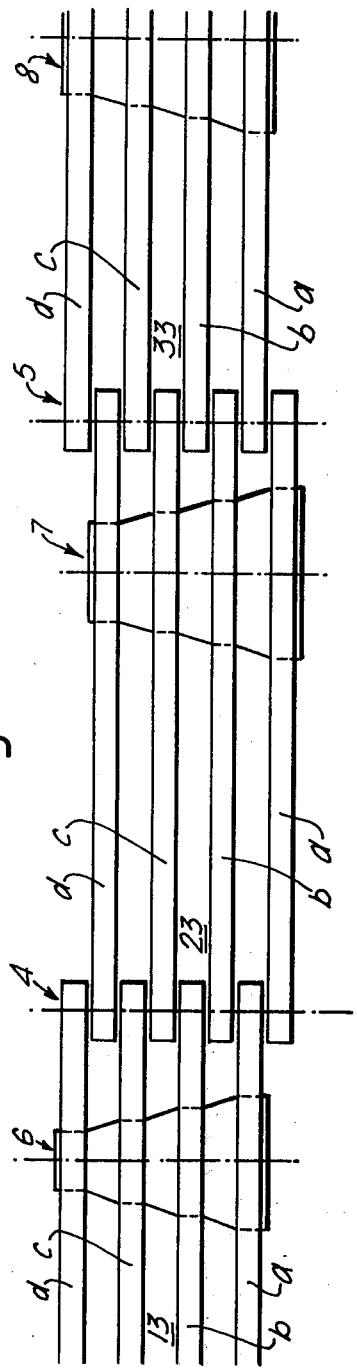
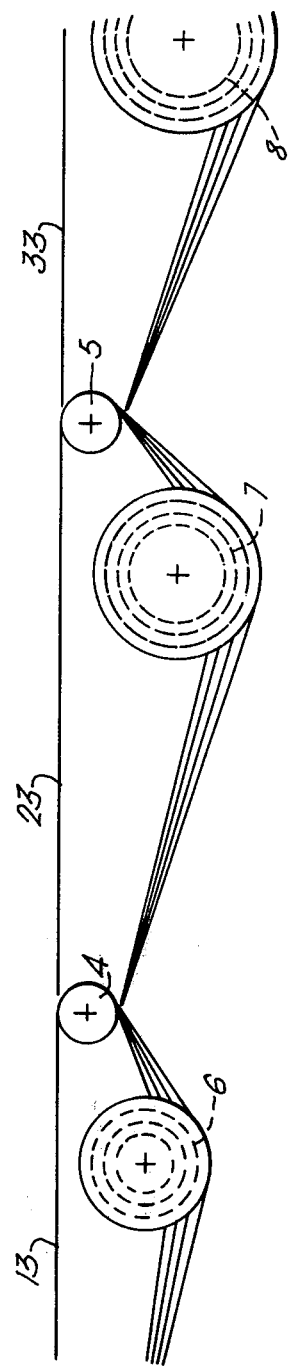

APPARATUS FOR CONVEYING FISH FROM A FIRST LOCATION TO A SECOND LOCATION

SUMMARY OF THE INVENTION

The present invention relates to an apparatus for feeding fish individually along a substantially V-shaped groove.

In connection with several fish treating machines it is required that the fish be fed individually to such machine from a storage bin or the like. It is a specific purpose of this invention to satisfy such requirement.

For this purpose, an apparatus is suggested for feeding fish individually, which apparatus comprises a substantially V-shaped groove, feeding elements being disposed in or along the walls of the groove, the speed of the feeding elements increasing lengthwise of the groove and towards the bottom of the groove. The feeding elements may be in the form of truncated cones or, alternatively, in the form of belts, chains or the like.

Two embodiments of the invention will now be described with reference to the accompanying drawings.

DESCRIPTION OF THE DRAWINGS

FIG. 3 shows a view of another embodiment of the invention, at right angles to one of the walls of the V-shaped groove; and FIG. 4 shows a view at right angles to that of FIG. 3.

DETAILED DESCRIPTION OF THE PREFERRED EMBODIMENTS

Figure 1:
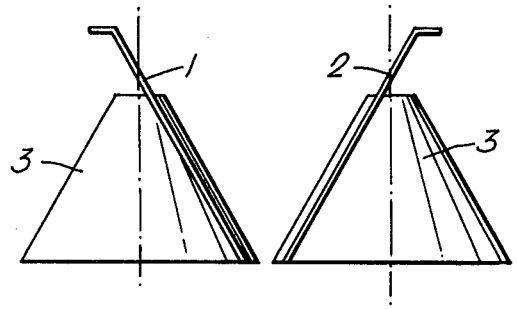
FIGS. 1 and 2 schematically show an end view and a plan view, respectively, of an apparatus according to the invention.
Figure 2:
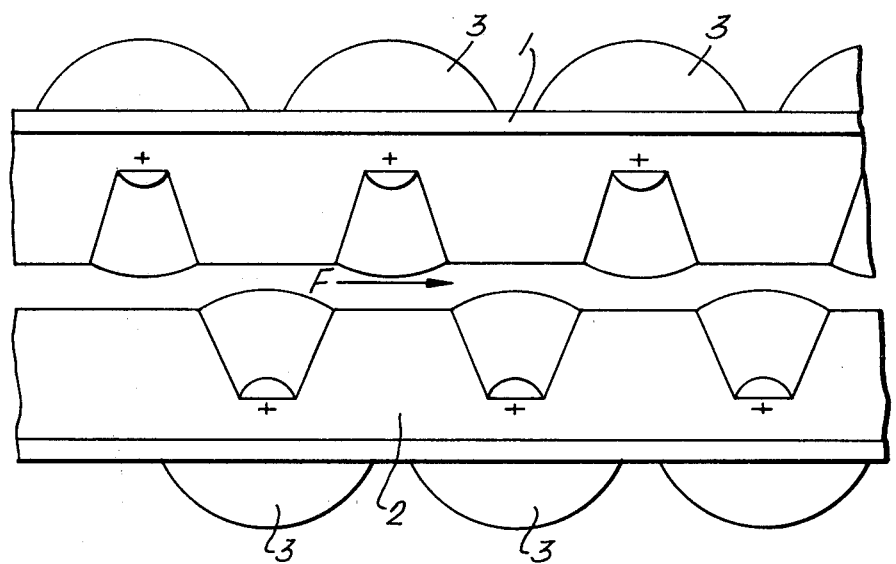

In the embodiment shown in FIGS. 1 and 2, a substantially V-shaped feed groove is provided with walls 1 and 2 with cutouts in which are mounted feeding elements in the form of truncated cones 3. By means of a chain or belt transmission the cones 3 may be rotated, one faster than the preceding. The arrow F (FIG. 2) indicates the direction of feed, and the cones to the right are rotated faster than the or those to the left thereof. The cones 3 may be mounted directly opposite each other in the respective walls 1 and 2, or they may, as in the drawing, be mounted so that the cones in one wall are offset with respect to the cones in the other wall.

Fish which at the inlet end (to the left—FIG. 2) lies on top of or side by side with respect to other fish will, in the apparatus according to the invention, be separated during the feed through the apparatus and will be delivered individually at the outlet or delivery end (to the right—FIG. 2).

If two or more fish are placed simultaneously in the inlet region of the groove, the fish being lowermost will be in engagement with such part of the cones having the greatest peripheral speed. This lowermost fish will consequently be given a stronger drive and higher acceleration than the fish lying higher up and being in engagement with a narrower part of the cones.

The separating effect is amplified by the weight of the fish lying higher up acting on the lowermost fish so that the latter attain greater frictional force and thus greater acceleration. Thus, the lowermost fish will be moved quicker than the higher fish and the higher fish will subsequently move downwards, but at such time the originally lowermost fish will have been moved further in the apparatus to engagement with cones having a greater rotational speed. In this manner, there will be a definite separation of the fish, i.e., the fish will, even when entering the apparatus several at a time, be delivered from the apparatus individually.

Instead of truncated cones, the feeding elements with mutually increasing speed may be in the form of belts, chains or the like having their active runs moving along the walls of the V-shaped grooves, a number of mutually parallel and mutually offset belts or chains being arranged on each wall of the groove. One such embodiment is shown schematically in FIGS. 3 and 4, the feeding elements being in the forms of belts 13a-b-c-d, 23a-b-c-d and 33a-b-c-d, each set of belts running around a pair of idler rollers, such as those shown at 4 and 5, and around a drive wheel 6 or 7 or 8, respectively, each drive wheel being stepped, with one step for each belt in the set, to provide mutually increasing belt velocities, and the various drive wheels being made one larger than the preceding or being rotated faster, to provide a greater peripheral speed and thus belt velocities in the belt set in consideration being greater than the belt velocities in the preceding belt set.

I claim:

1. An apparatus for conveying fish from a first location to a second location in such a way that the fish are individually delivered from the exit end of the apparatus at the second location, the apparatus comprising first and second wall means forming a V-shaped groove which extends from the first location on the second location, each of said first and second wall means including openings therein which are spaced apart along the length of said V-shaped groove, the openings in the first wall means being offset with respect to the openings in the second wall means, separate truncated cones positioned such that the surface portions thereof respectively extend through the respective openings in said first and second wall means and into the V-shaped groove to contact and move fish along the V-shaped groove from the first location to the second location, and drive means connected to the separate truncated cones to cause the truncated cones to rotate such that the fish in the V-shaped groove will move at an increasing speed from the first location to the second location and at an increasing speed the closer they are located with respect to the bottom of the V-shaped groove.

2. An apparatus for conveying fish from a first location to a second location in such a way that the fish are individually delivered from the exit end of the apparatus at the second location, the apparatus comprising first and second wall means forming a V-shaped groove which extends from the first location to the second location, each of said first and second wall means including openings therein which are spaced apart along the length of said V-shaped groove, separate idler rollers positioned such that surface portions thereof respectively extend through respective openings in the said first and second wall means and into the V-shaped groove to contact and move fish along the V-shaped groove from the first location to the second location, individual belts which wrap around adjacent idler rollers on the same wall means such that portions of their runs move along the respective wall means, and drive means connected to cause the individual belts to move along their respective wall means such that the fish in the V-shaped groove will move at an increasing speed from the first location to the second location and at an increasing speed the closer they are located with respect to the bottom of the V-shaped groove.

3. The apparatus as defined in claim 2 including stepped drive wheels between each pair of adjacent idler rollers and positioned behind the respective wall means, the individual belts wrapping around each pair of adjacent idler rollers being also wrapped around the associated stepped drive wheel, and wherein the drive means comprises a drive motor connected to each stepped drive wheel to rotate the associated drive wheel in the direction of the exit end of the apparatus faster than the preceeding one.

* * * * *